(12) United States Patent
Woodral et al.

(10) Patent No.: US 7,230,549 B1
(45) Date of Patent: Jun. 12, 2007

(54) METHOD AND SYSTEM FOR SYNCHRONIZING BIT STREAMS FOR PCI EXPRESS DEVICES

(75) Inventors: David E. Woodral, Walnut, CA (US); Richard S. Moore, Irvine, CA (US); Yongsheng Zhang, San Jose, CA (US); Muralidharan Viswanathan, Bangalore (IN); Kamal Jain, Bangalore (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 116 days.

(21) Appl. No.: 11/222,592

(22) Filed: Sep. 9, 2005

(51) Int. Cl.
*H03M 5/00* (2006.01)

(52) U.S. Cl. .................. 341/52; 341/100; 341/101
(58) Field of Classification Search .................. 341/51, 341/81, 82, 106; 375/272, 372
See application file for complete search history.

(56) References Cited

U.S. PATENT DOCUMENTS

| | | | | |
|---|---|---|---|---|
| 3,017,610 A | * | 1/1962 | Auerbach et al. ...... | 340/146.12 |
| 5,835,496 A | * | 11/1998 | Yeung et al. ........ | 370/514 |
| 5,907,566 A | * | 5/1999 | Benson et al. ........ | 714/798 |
| 6,323,789 B1 | * | 11/2001 | Lawrence ........... | 341/102 |
| 6,407,682 B1 | * | 6/2002 | Jones .............. | 341/100 |
| 7,093,151 B1 | * | 8/2006 | Williams ........... | 713/500 |
| 2003/0219040 A1 | * | 11/2003 | Kim et al. .......... | 370/503 |
| 2006/0109929 A1 | * | 5/2006 | Tripathi ............ | 375/272 |
| 2006/0161702 A1 | * | 7/2006 | Bowlby et al. ........ | 710/71 |

* cited by examiner

*Primary Examiner*—Linh Nguyen
(74) *Attorney, Agent, or Firm*—Klein, O'Neill & Singh, LLP

(57) ABSTRACT

A PCI Express device is provided. The PCI Express device includes a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value. The special character is a comma sequence. After a symbol lock is declared, the state machine continues to monitor incoming bit stream data and compares each new special character alignment with the previously stored alignment value. During the monitoring if a misaligned special character is detected, then the state machine waits to receive another special character before declaring a loss of synchronization.

18 Claims, 9 Drawing Sheets

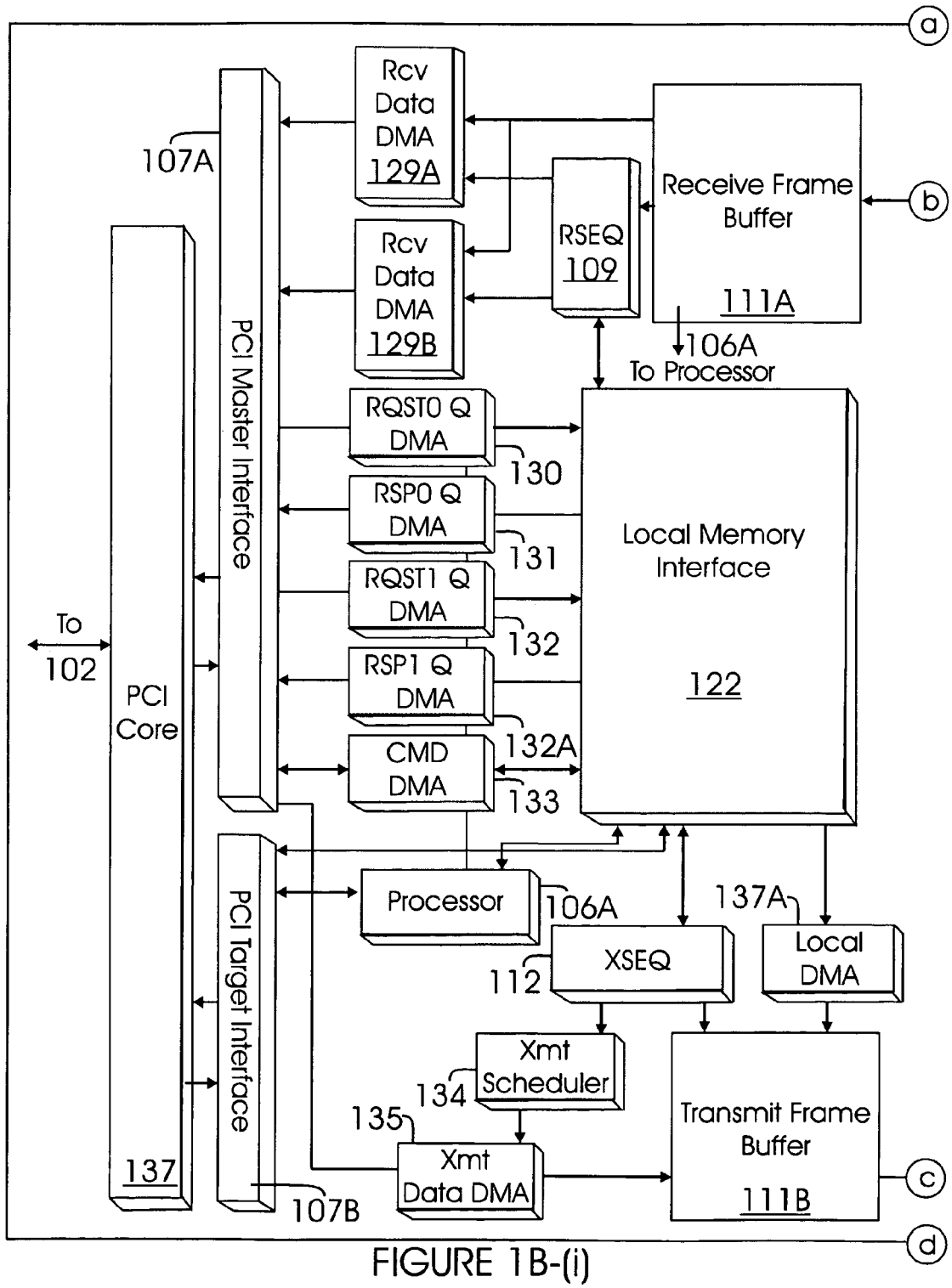
FIGURE 1B-(i)

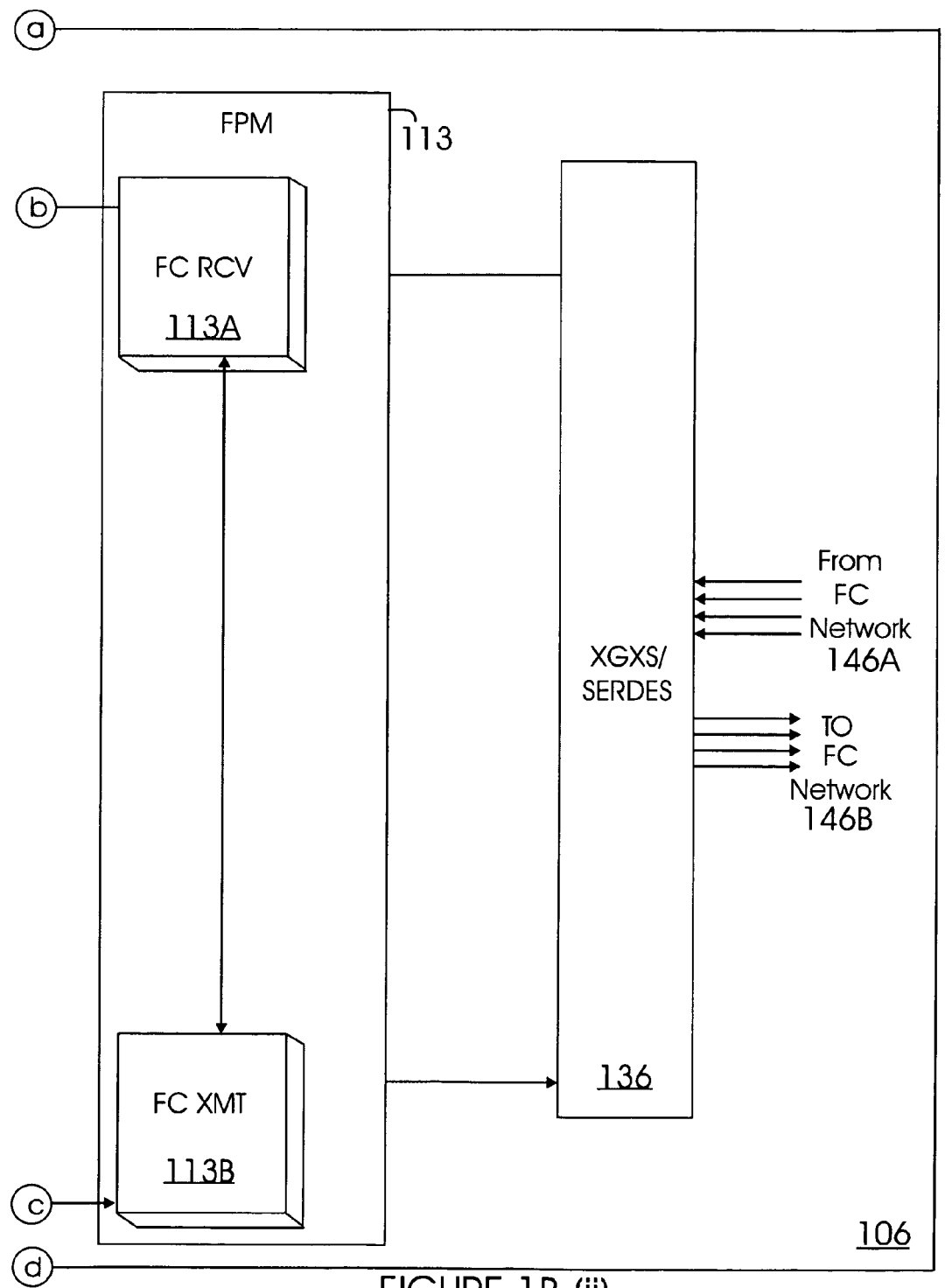
FIGURE 1B-(ii)

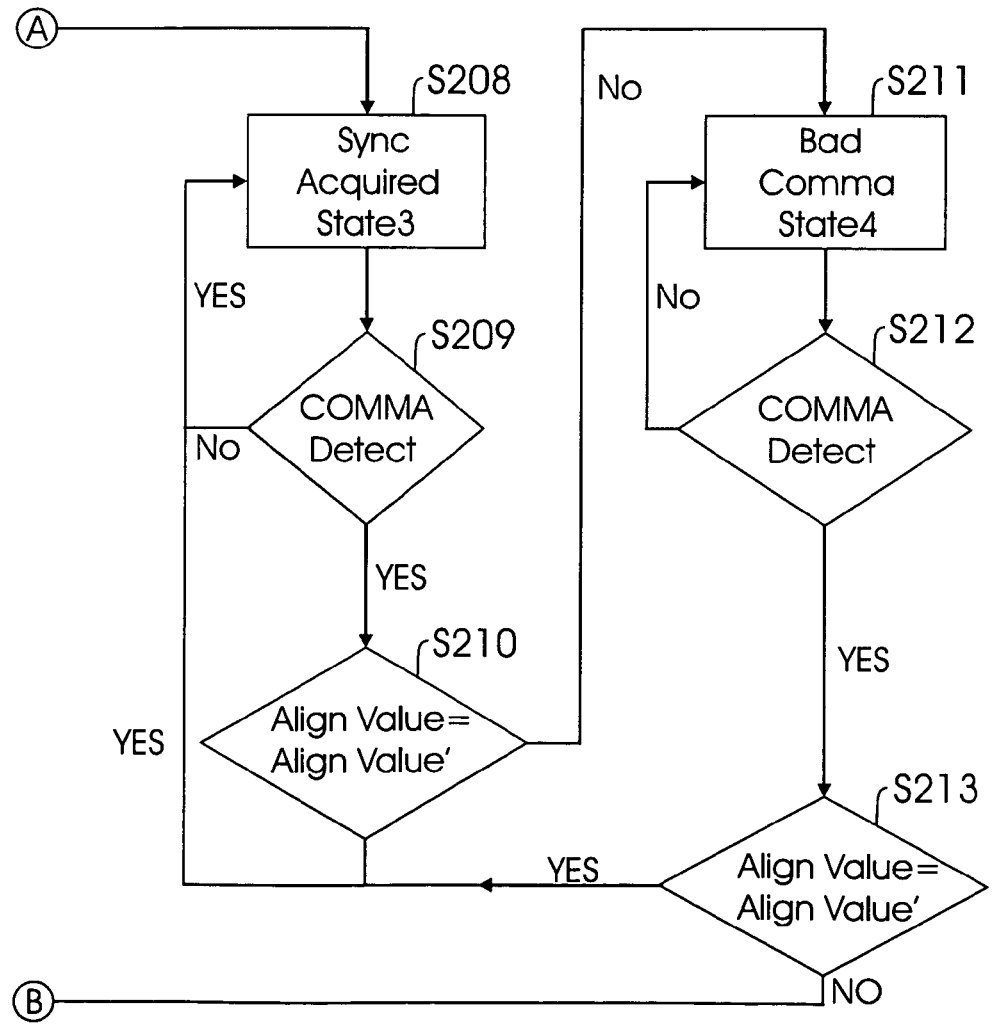
FIGURE 2 (ii)

METHOD AND SYSTEM FOR SYNCHRONIZING BIT STREAMS FOR PCI EXPRESS DEVICES

BACKGROUND

1. Field of the Invention

The present invention relates to computing systems, and more particularly, to synchronizing serial bit stream data for PCI Express devices.

2. Background of the Invention

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with peripheral devices via an interface such as the Peripheral Component Interconnect ("PCI") interface, a local bus standard using parallel data transfer that was developed by Intel Corporation®, or the extension of PCI known as PCI-X. More recently, PCI Express, a standard interface incorporating PCI transaction protocols at the logical level, but using serial data transfer at the physical level has been developed to offer better performance than PCI or PCI-X.

Host systems are used in various network applications, including TCP/IP networks, storage area networks ("SANs"), and various types of external device attachment. In SANs, plural storage devices are made available to various host computing systems. Data is typically moved between plural host systems and storage systems (or storage devices, used interchangeably throughout this specification). The connectivity between a host system and networks or external devices is provided by host bus adapters ("HBAs"), which plug into the host system. HBAs may attach to the host system via a standard interface such as PCI Express.

PCI Express HBAs receive serial data streams (bit streams), align the serial data and then convert it into parallel data for processing. PCI Express HBAs operate as transmitting devices as well as receiving devices using the Comma sequence for identifying symbol boundaries.

PCI Express is an Input/Output ("I/O") bus standard (incorporated herein by reference in its entirety) that is compatible with existing PCI cards. PCI Express uses discrete logical layers to process inbound and outbound information. In the PCI Express terminology, a serial connection between two devices is referred to as a link.

Various other standard interfaces are also used to move data between host systems and peripheral devices. Fibre Channel is one such standard. Fibre Channel (incorporated herein by reference in its entirety) is an American National Standard Institute (ANSI) set of standards, which provides a serial transmission protocol for storage and network protocols.

PCI Express, Fibre Channel and other serial interfaces use 8-bit to 10-bit encoding, in which each 8-bit character of source data is encoded into a 10-bit symbol prior to transmission. A receiving device decodes the 10-bit data to recover the original 8-bit character. 8b-10b encoding provides a number of advantages such as the ability to embed clocking information into a serial bit stream and the ability to detect transmission errors.

In order to recover data from a serial bit stream, the receiving PCI Express device performs clock recovery, de-serialization and symbol lock. In clock recovery, the receiving device generates a serial bit clock that is phase locked to the incoming serial bit stream. This is also known as bit synchronization. For de-serialization, the recovered clock is used to sample the incoming serial bit stream and converts it into parallel data.

For symbol lock, the boundary between consecutive 10-bit symbols is determined and the de-serialized data is aligned to the boundary. After the symbol lock, the 10-bit data is sent to an elastic buffer and then the 10-bit data is decoded to 8-bit data for further processing.

A COMMA symbol is a special bit pattern that is often used to determine symbol and word alignment in a serial stream of data. K28.5 Comma symbol is a unique bit pattern used in bit streams to identify special control sequences not normally found in conventional user data. The 10-bit encoding of the Comma symbol is unique because it is the only symbol that contains two bits of one polarity followed by five bits of opposite polarity, i.e., 0011111010b or 1100000101b. The nature of the 8-bit to 10-bit coding provides a comma sequence that does not occur in a non-comma character, nor in any consecutive combination of non-comma characters, and hence, identifies symbol boundaries.

Once a Comma symbol (or sequence) is detected, the receiving device assumes that the received symbols that follow will be on the same 10-bit boundary. The receiving device also assumes that data is aligned after the Comma character is detected. However, in reality, a data stream may get misaligned due to single bit errors and cause various processing errors. Errors may include loss of bit synchronization and random bit errors. The former may cause bits to be added to or deleted from the de-serialized data, resulting in loss of symbol lock; the latter causes incorrect values to be assigned to one or more bits without loss of synchronization or loss of symbol lock.

Most serial protocol standards specify exact requirements for detecting symbol lock and for detecting loss of symbol lock. Such is not the case with the PCI Express standard, which has left the functional requirements for symbol lock to designers of PCI-Express devices.

Conventional symbol lock techniques used for interfaces such as Fibre Channel do not provide an effective solution for PCI Express applications, as described below. In Fibre Channel, symbol alignment involves aligning to transmission word boundaries, where a word is four consecutive 10-bit symbols. If a transmission word contains a comma character, then the comma character is expected to be in the first symbol only.

In Fibre Channel, comma characters occur frequently; there is a minimum of 6 ordered sets transmitted in an inter-frame gap following every frame of 2112 symbols or less, where an ordered set is a transmission word containing a comma character followed by a prescribed sequence of non-comma characters. The Fibre Channel symbol lock requirement calls for detection of 3 ordered sets, each starting with a comma, with no intervening invalid transmission words. Once symbol lock is achieved, the symbol lock circuit monitors the data stream for the occurrence of transmission errors. If a sequence of 7 consecutive transmission words contains 4 or more invalid transmission words, then a loss of symbol lock is declared, and the initial alignment procedure is repeated.

Although it uses the same 8b-10b coding set, PCI Express differs from Fibre Channel, which makes the above method impractical. First, PCI Express does not group symbols into transmission words, so an ordered set may begin on any symbol that is not part of a packet. Thus, a symbol lock circuit for PCI Express needs to examine individual symbols rather than transmission words. Second, PCI Express devices do not transmit comma characters as frequently, except during training sequences, which are used to establish bit synchronization and symbol alignment during link initialization and following low-power link states during which data transmission is suspended. During normal full-power operation, there may be as many as 5650 symbols between comma characters. This corresponds to the maximum allowed scheduling interval for skip ordered sets, which are ordered sets per the PCI Express standard for prevention of overflow or underflow of the elastic buffers of receiving devices, plus the maximum residual packet length before the scheduled skip ordered set is actually transmitted. Furthermore, because skip ordered sets are isolated, (unlike in Fibre Channel, in which ordered sets are clustered in the inter-frame gaps), the receipt of 3 commas for symbol lock acquisition would span multiple PCI Express packets.

Bit error rates are typically expected to be low, but are not bounded by the PCI Express standard, so the symbol lock circuit is expected to perform well in noisy systems with high bit error rates. In such an environment, there exists a significant probability that an alignment attempt using the Fibre Channel method would fail due to transmission errors within the first three comma occurrences, extending the time required for symbol lock far beyond the original expectation.

Conventional systems are not efficient in detecting unique bit sequences and maintaining proper alignment. Therefore, there is a need for a method and system that can detect a unique bit stream pattern, monitor a data stream for errors and maintain proper alignment.

SUMMARY OF THE INVENTION

In one aspect of the present invention, a PCI Express device is provided. The PCI Express device includes a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value. The special character is a comma sequence.

After a symbol lock is declared, the state machine continues to monitor incoming bit stream data and compares each new special character alignment with the previously stored alignment value.

During the monitoring if a misaligned special character is detected, then the state machine waits to receive another special character before declaring a loss of synchronization.

If another special character matching the previously stored alignment value is received, then the state machine moves to a state in which a symbol lock is declared.

If a second misaligned special character is received, then the state machine moves to a state in which it has to re-capture synchronization.

In another aspect of the present invention a system with a PCI Express device is provided. The PCI Express device has a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value.

In another aspect of the present invention, a HBA is provided. The HBA includes a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value.

In yet another aspect of the present invention, a method for aligning bit stream data is provided. The method includes, monitoring an incoming bit stream for detecting a first special character symbol; storing an alignment value of a detected special character; detecting at least a second special character symbol; comparing alignment of the second special character symbol with a stored alignment value; and declaring a symbol lock if alignment of the second special character symbol matches with alignment of the first special character symbol.

In yet another aspect of the present invention, a system for transferring data between a host and a storage device is provided. The system includes, a host bus adapter having a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B (B(i)-B(ii)) shows a block diagram of an HBA, used according to one aspect of the present invention;

DETAILED DESCRIPTION OF THE PREFERRED EMBODIMENTS

To facilitate an understanding of the preferred embodiment, the general architecture and operation of a host system/HBA/PCI Express device will be described. The specific architecture and operation of the preferred embodiment will then be described with reference to the general architecture.

Figure 1A:
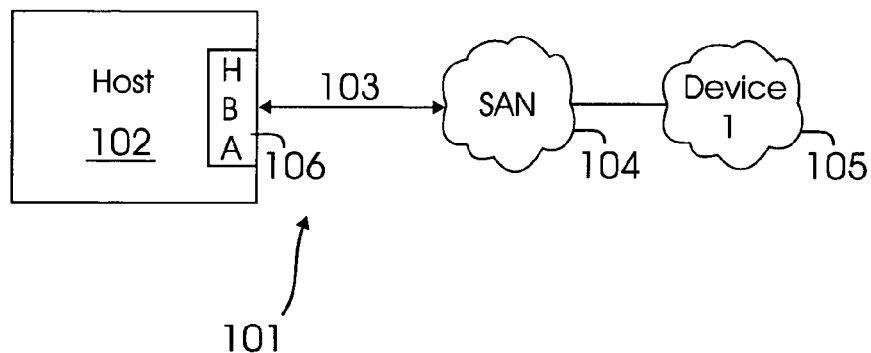
FIG. 1A shows a block diagram of a host system communicating with a device.

Host System/HBA:

FIG. 1A shows a block diagram of a system 101 where a host computing system 102 is coupled to a storage device 105 via a SAN 104. HBA 106 facilitates data transfer between host 102 and device 105.

FIG. 1B shows a block diagram of HBA 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from a host memory (not shown) to the storage systems via adapter 106. Receive path means data path from storage subsystem via adapter 106. Buffers 111A and 111B are used to store information in receive and transmit paths, respectively.

In addition to the dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory (not shown) and local memory interface 122. Memory interface 122 is provided for managing local memory. Local DMA module 137A is used for gaining access to a channel to move data from local memory (108/110). Adapter 106 also includes a serial/de-serializer (shown as "XGXS/SERDES") 136 for converting data from 10-bit to 8-bit format and vice-versa.

Adapter 106 also includes request queue DMA channel (0) 130, response queue (0) DMA channel 131, response queue (1) 132A, and request queue (1) DMA channel 132 that interface with a request queue and response queue in host memory (not shown); and a Command DMA channel 133 for managing Command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

PCI master interface 107A and PCI target interface 107B are both coupled to PCI Express Core logic 137 (may also be referred to as "logic 137" or "module 137"). Interface 107A and 107B includes an arbitration module that processes DMA access to plural DMA channels.

It is noteworthy that the present invention is not limited to the foregoing architecture of HBA 106, and other architectures/configurations may be used to implement the adaptive aspects of the present invention.

Figure 1C:
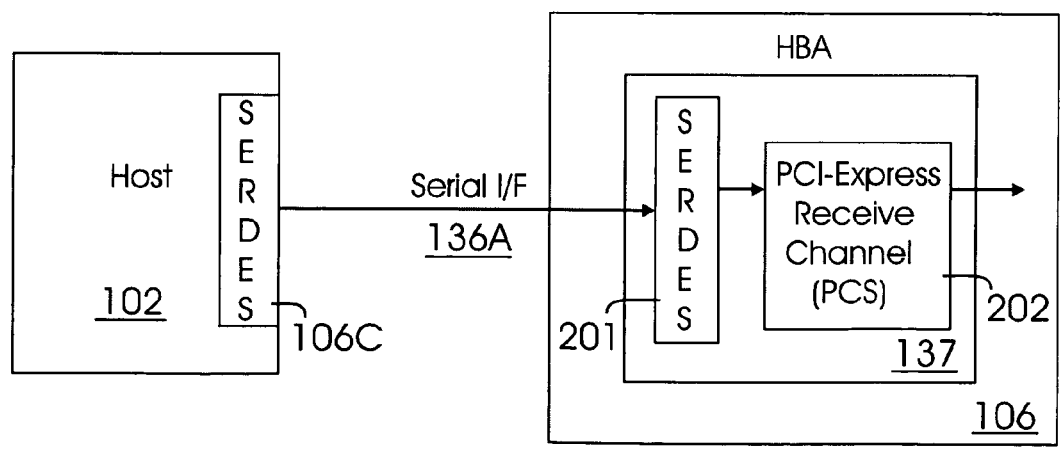
FIG. 1C shows a block diagram of a portion of an HBA with a PCI Express Physical Coding Sublayer (PCS) module, used according to one aspect of the present invention.
Figure 1D:
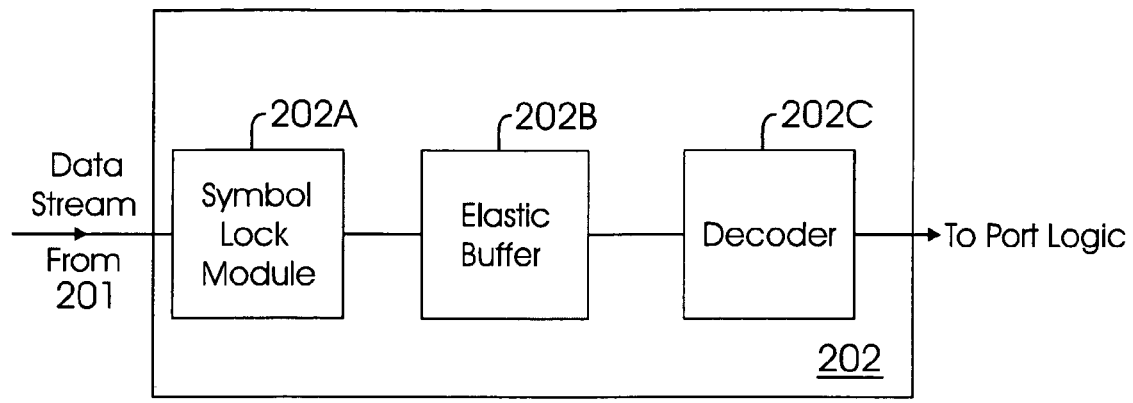
FIG. 1D shows a block diagram of a PCS module with a symbol lock module, according to one aspect of the present invention.
Figure 1F:
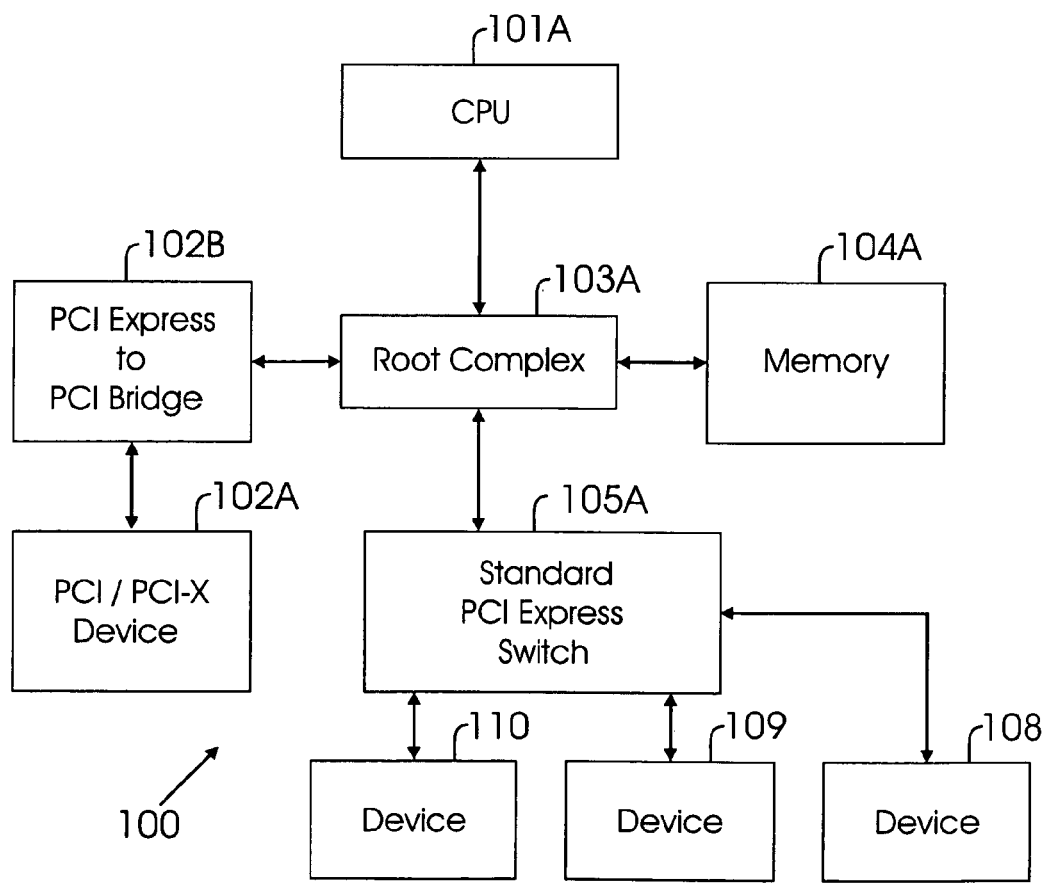
FIG. 1F shows a block diagram of a standard PCI Express standard topology.

PCI Express Overview:

FIG. 1F shows a block diagram of a PCI Express standard fabric topology 100. A central processing unit ("CPU") 101A (part of a computing or host system) is coupled to a "root complex" 103A. Root complex 103A as defined by the PCI Express standard is an entity that includes a Host Bridge and one or more Root Ports. The Host Bridge connects a CPU to a Hierarchy; wherein a Hierarchy is the tree structure of a PCI Express topology.

Root complex 103A is coupled to a PCI Express/PCI bridge 102B that allows CPU 101A to access a PCI (or PCI-X) device 102A. Memory 104A is also coupled to root complex 103A and is accessible to CPU 101A.

Root complex 103A is also coupled to a standard PCI Express switch (may be referred to as "switch") 105A that is coupled to devices 108-110. CPU 101A can communicate with any of the devices 108-110 via switch 105A. It is noteworthy that the path between root complex 103A and any of devices 108-110 may also be a direct path with no switch, or it may contain multiple cascaded switches.

PCI Express uses discrete logical layers to process inbound and outbound information. The logical layers are the Transaction Layer 114B, Data Link Layer ("DLL") 114A and a Physical Layer ("PHY") 115A, as shown in FIG. 1H. A receive side communicates with a transmit side.

PCI Express uses a packet-based protocol to exchange information between Transaction layers 114B. Transactions are carried out using Requests and Completions. Completions are used only when required, for example, to return read data or to acknowledge completion of an I/O operation.

At the transmit side, packets flow from the Transaction Layer 114B to PHY 115A. On the receive side, packets are processed by the PHY layer 115A and sent to the Transaction layer 114B for processing. DLL 114A serves as an intermediate layer between PHY layer 115A and Transaction layer 114B.

The Transaction Layer 114B assembles and disassembles Transaction Layer Packets ("TLPs"). TLPs are used to communicate transactions, such as read and write and other type of events.

The PHY Layer 115A is typically implemented in three sublayers. The uppermost of these sublayers is the Media Access Control (MAC) sublayer, which is responsible for link training, framing of packets, scrambling and descrambling of data, and deskewing of received data. Below the MAC is the Physical Coding Sublayer (PCS) described in greater detail below. Below the PCS is the Physical Media Attachment (PMA) sublayer, which includes the serial/deserializer (referred to as "serdes" throughout this specification) and analog receivers and transmitters. Transaction Layer 114B, the Data Link Layer 114A, and the MAC portion of the PHY layer 115A are included in Port Logic 137A of FIG. 1G.

Symbol Lock Module 202A:

FIG. 1C shows a block diagram of a system with host 102 interfacing with HBA 106 having logic 137. Logic 137 includes a serial/de-serializer 201 and a PCI Express receive channel ("PCS") 202 that are described below in detail.

Host 102 sends random serial data (bit streams) via serdes 106C and serial interface 136A. Serdes 201 receives the incoming data stream and passes the data stream to PCS 202.

FIG. 1D shows a block diagram of PCS 202 with a symbol lock module 202A (also referred to as "module 202A"), an elastic buffer (may also be referred to as a "buffer") 202B and a decoder 202C.

Module 202A receives raw bit stream data from serdes 201, and determines the appropriate symbol boundary using the K28.5 Comma symbol and then properly aligns the received data. When a Comma symbol is detected, the current alignment value or bit-offset value is marked, providing an offset in the serial bit stream from the first bit of each deserialized data group provided by the serdes to the first bit of a valid symbol. This alignment value is used to output valid symbol information and verify/maintain proper symbol alignment. The Comma information is used to acquire and maintain proper symbol lock, as described below with respect to the FIG. 2 state machine/process flow diagram and FIG. 3, detailed block diagram for module 202A.

Based on the location of the Comma character, incoming bits are aligned and then stored in a buffer 202B. Buffer 202B includes any type of memory for storing the aligned bit stream data.

Decoder 202C takes the aligned data from buffer 202B and decodes 10-bit data to 8-bit data. The decoded 8-bit data is then sent to other components in HBA 106 (or any other PCI Express device) for processing. It is noteworthy that FIG. 1D shows only the receive side.

Typically, serdes 201 receives serial data, performs bit synchronization, and stores the received bits, still unaligned, into a registered parallel output that is 10 bits, 20 bits, or some other multiple of 10 bits (or a multiple of the encoded symbol size). serdes 201 provides a clock that is phase-locked to the received data and at a frequency equal to the received data bit rate divided by the width of the parallel interface. A Comma character is used to determine the boundary between successive symbols. The incoming bits from serdes 201 are then synchronized with respect to the Comma character.

Although the example of FIG. 1D is given with respect to an HBA, the present invention is applicable to any PCI Express device. The general architecture with respect to PCI Express devices is shown in FIG. 1G, where PCI Express device 1 communicates with PCI Express device 2 using the serial interface 136A. In this configuration, Port Logic 137A in PCI Express Device 1 transmits PCI Express data which is encoded in PCS 202 and serialized in serdes 106C. Serdes 106C transmits a serial bit stream to serdes 201 where it is deserialized. PCS 202 in PCI Express Device 2 decodes the data. The port logic 137A in PCI Express device 2 receives the decoded data from PCS 202. It is noteworthy that each PCI Express device contains both a transmit channel and a receive channel even though FIG. 1G shows only the transmit channel of PCI Express Device 1 and the receive channel of PCI Express Device 2.

Figure 1E:
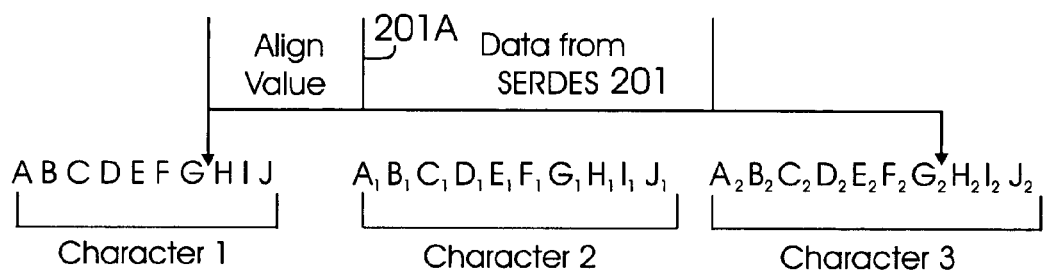
FIG. 1E shows an example of a bit stream processed according to one aspect of the present invention.
Figure 1G:
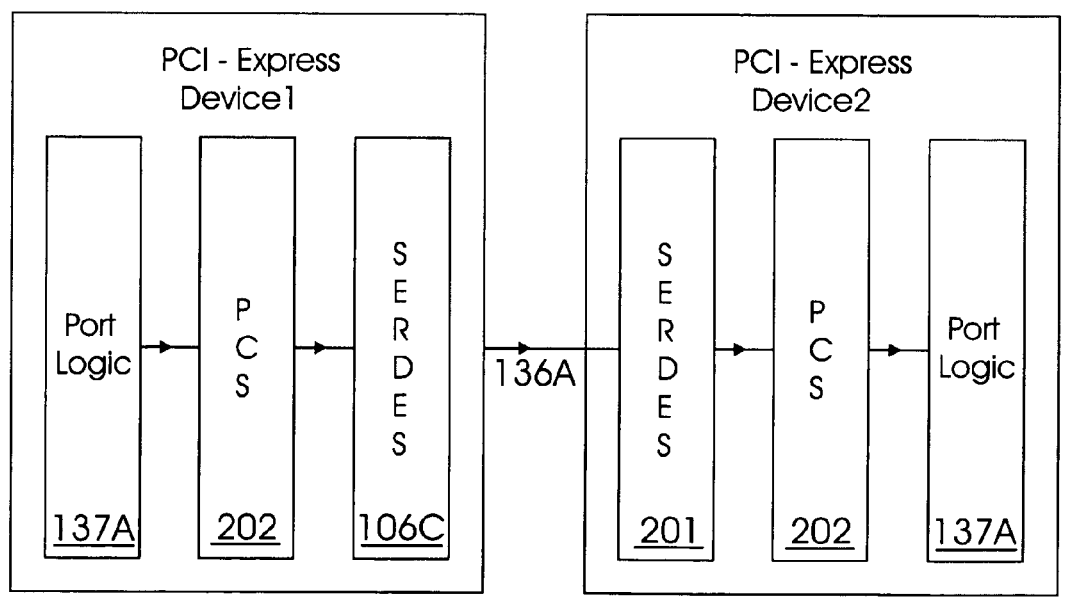
FIG. 1G shows a block diagram of generic PCI-Express devices communicating with each other.
Figure 1H:
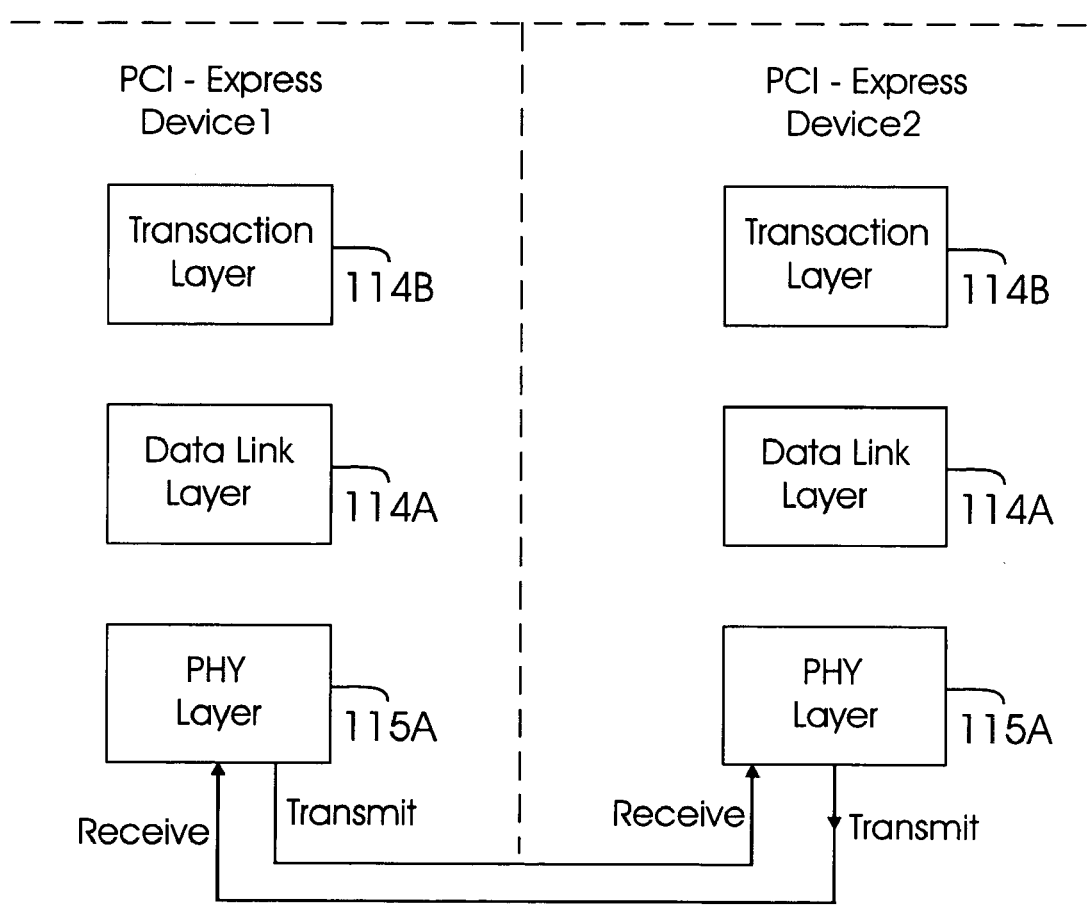
FIG. 1H shows the layered structure of PCI Express devices.

FIG. 1E shows an example of a bit stream from serdes 201 highlighting the importance of bit stream synchronization. Three characters 1, 2 and 3 are shown in FIG. 1E. The 20 bits received from the serdes 201 may include bits from all the three symbols.

The positional alignment of symbols (shown as Align Value 201A) from the serdes 201 output is random. A comma pattern appears in the first 7 bits of a symbol, and so it may appear in the position represented by A through G, A1 through G1, or A2 through G2. Hence, it is important to determine the comma's location within a window that includes a current serdes 201 output data and the last 6 bits of the previous data from serdes 201. The offset (shown as Align Value 201A) determined by this inspection is saved in a register (Alignment Storage 304). This stored offset value is used as a selection input to a bit shifter (Data Selector 310), which aligns the data into the correct position before sending it to the next stage, as described below with respect to FIGS. 2 and 3.

In one aspect of the present invention, module 202A detects proper symbol alignment, continually monitors the incoming data stream from serdes 201 to detect any errors and then re-establishes synchronization when and if the error occurs.

Figure 3:
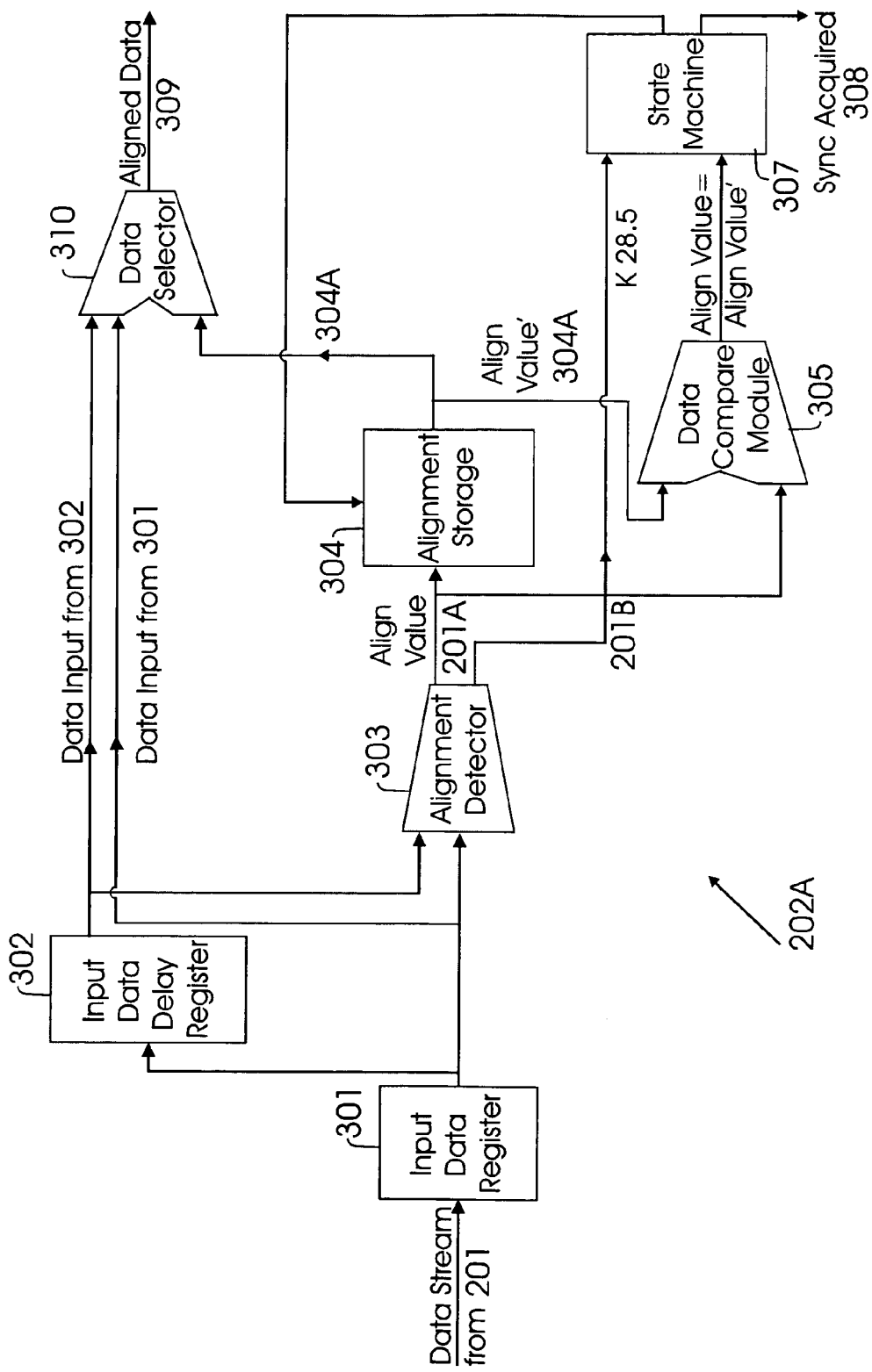
FIG. 3 shows a block diagram of a symbol lock module, according to one aspect of the present invention

As shown in FIG. 3, module 202A receives a data stream from serdes 201 and is staged in registers 301 and 302. Data stream from registers 301 and 302 is sent to alignment detector 303 that detects a comma sequence in the input data stream. The alignment value 201A is stored in alignment storage register 304 and is compared with subsequent alignments (shown as Align Value' 304A) by data compare module 305.

The comma sequence (shown as 201B) is also sent to state machine 307 that monitors the alignment of subsequent data. State machine 307 transmits a SYNC Acquired signal 308 when the alignment values match (shown as Align Value=Align value'). Signal 308 denotes that a sequence of comma symbols has been successfully identified and that symbol lock synchronization is achieved.

Data selector 310 receives data input from registers 301 and 302, the alignment value 304A from register 304 and sends aligned data 309 to the elastic buffer 202B (shown in FIG. 1D).

The following provides a description of a state machine 307 diagram for data alignment.

Process Flow

Figure 2:
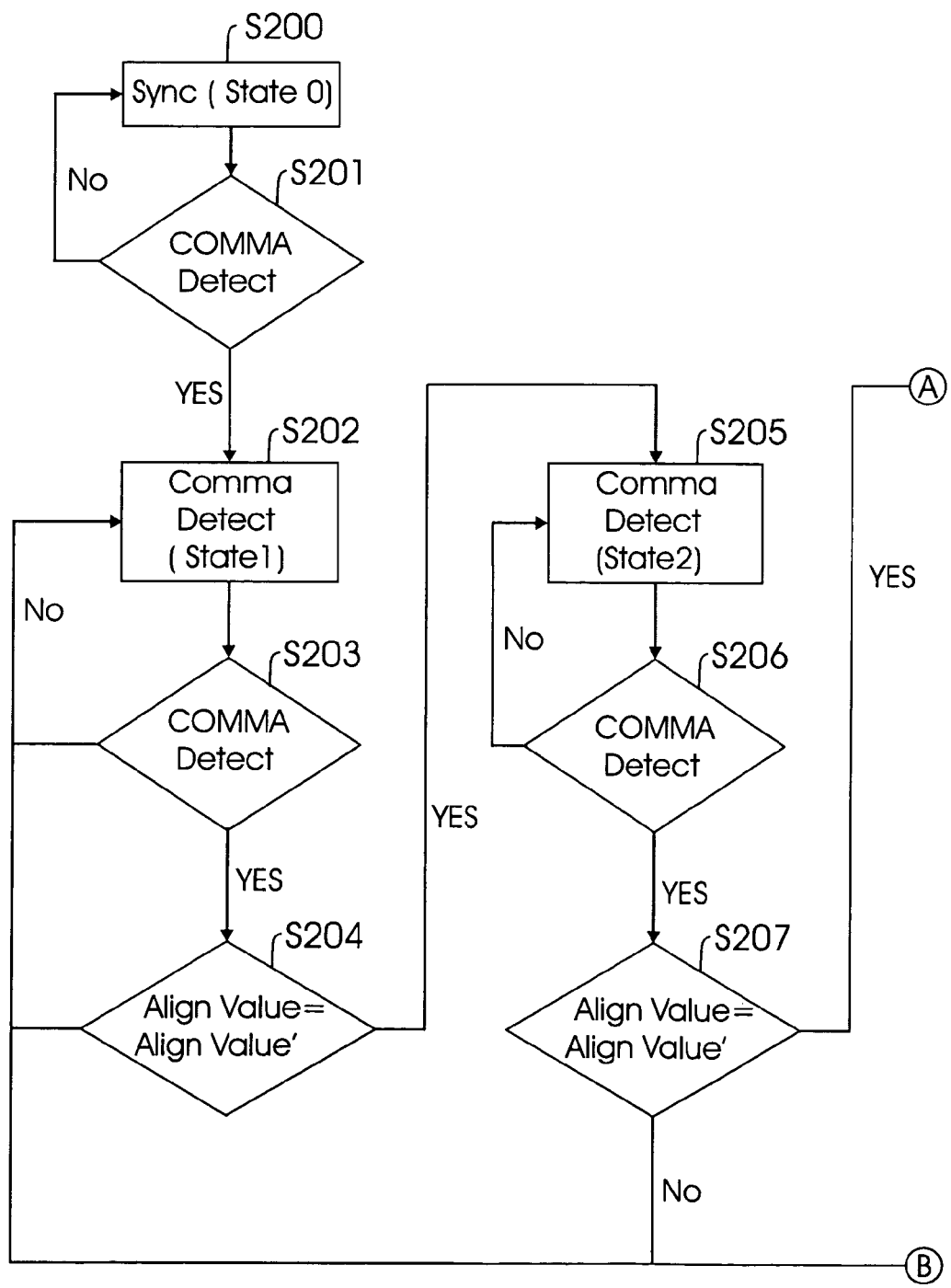
FIG. 2 is a state machine diagram of process steps, according to one aspect of the present invention.

Turning in detail to FIG. 2, an idle state is shown as Sync State (State 0) in step S200. The idle state is invoked when PCS 202 has a loss of symbol lock (or a loss of signal, used interchangeably) or a reset condition is forced. Symbol lock is a condition where PCS 202 is assured of a symbol's position and a lock is placed for data alignment purposes. In State 0, state machine 307 monitors incoming bit stream from serdes 201 to detect a Comma symbol.

To acquire a symbol lock, state machine 307 detects a certain number (i.e. a minimum number) of Comma symbols, for example, 3, as shown in the FIG. 2 state machine diagram. It is noteworthy that the present invention is not limited to detecting any particular number of Comma symbols.

While the state machine is in idle state, a Comma is detected in step S201. The state machine then advances to the next state (Comma Detect State or "State 1")) in step S202 and the Comma position detected in step S201 is stored (for example, stored as Align Value').

In step S203, state machine 307 determines if it has received another Comma symbol. If yes, then in step S204, state machine 307 compares the alignment position (Align Value) of the Comma received in step S203 with the alignment position (Align Value') of the Comma detected in step S201. If the alignment positions do not match, Align Value' is updated with the current Comma position (AlignValue) and then the process reverts back to step S202.

If the alignment positions match, then the process moves to step S205 when state machine 307 moves to State 2.

In step S206 (i.e. "Comma Detect" or "State 2"), state machine 307 determines if it has received another Comma character. If a Comma character has not been received, the process reverts back to step S205 (i.e. to State 2). If another Comma character is detected in step S206, then in step S207, the alignment (AlignValue) of the Comma detected in step S206 is compared to the previously stored alignment value (Align Value'). If there is no match, Align Value' is updated with the current Comma position (AlignValue) and the process reverts back to step S202.

If there is a match in step S207, then the process moves to step S208, when the state machine 307 moves to the Sync Acquired State (or "State 3"), which denotes that synchronization of the input bit stream has been achieved with respect to the Comma symbol. During this stage, a symbol lock is achieved and then each subsequent symbol received while in this state is stored in buffer 202B.

In step S209 (i.e. during State 3); state machine 307 continues to monitor Comma alignment position. If a Comma is not detected, the process stays in state 3. If a Comma is detected, then the alignment value is compared with the previous alignment value in step S210; if the alignment values match, the state machine 307 stays in state 3 (S208).

If the alignment values do not match in step S210, then the process moves to step S211, when the state machine 307 moves to state 4 (Bad Comma State or "State 4"). In this state, received symbols continue to be written into the elastic buffer 202B, while the state machine 307 determines if there is a need for re-acquiring symbol synchronization. In step S212, while in State 4, state machine 307 detects the next Comma symbol. If a comma is detected in step S212, then in step S213, the state machine 307 compares the alignment of the Comma in step S213 (Align Value) with the alignment of the Comma detected in step S207 when Synchronization was acquired (Align Value'). If the alignment values match in step S213, the process reverts back to State 3 (step S208). This signifies that the misalignment detected in step S210 was probably due to a random bit-error and did not affect the overall alignment of the bit stream. If a comma is not detected in step S212, then the state machine 307 moves to state 4 (S211).

If the alignment values do not match in step S213, then the process reverts back to step S202 (i.e. State 1), where the state machine 307 attempts to re-acquire synchronization based on a new alignment offset (from step S213). The new alignment offset (AlignValue) replaces the old stored offset value (Align Value'). Symbols may not be written to the elastic buffer 202B during the re-acquisition.

In one aspect of the present invention, symbol lock is achieved after the state machine 307 is convinced that the alignment with respect to the Comma character is proper. Also, the process flow diagram ensures that false alignment does not occur, since multiple commas are required to have identical offsets before symbol lock is achieved.

In another aspect of the present invention, false misalignment events due to random bit errors are ignored. The process uses at least two misaligned Comma symbols before a loss of synchronization is declared (step S213).

In yet another aspect of the present invention, the overall process for achieving symbol lock/synchronization is efficient.

In one aspect of the present invention, individual symbols are processed rather than words (unlike the Fibre Channel solution), and transmission errors are not counted against the symbol lock acquisition requirement of three commas.

It is noteworthy that although the foregoing illustration of the adaptive aspects of the present invention have been based on detecting Comma characters, any other unique character or unique bit pattern with a unique position or alignment may be used to achieve symbol lock/alignment.

Although the present invention has been described with reference to specific embodiments, these embodiments are illustrative only and not limiting. Many other applications and embodiments of the present invention will be apparent in light of this disclosure and the following claims.

What is claimed is:

1. A host bus adapter (HBA), comprising:
a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value;
wherein the special character is a Comma character;
wherein after a symbol lock is declared, the state machine continues to monitor incoming bit stream data and compares each new special character alignment with the previously stored alignment value; and
wherein during the monitoring if a misaligned special character is detected, then the state machine waits to receive another special character before declaring a loss of synchronization.

2. A host bus adapter (HBA), comprising:
a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value;
wherein the special character is a Comma character;
wherein after a symbol lock is declared the state machine continues to monitor incoming bit stream data and compares each new special character alignment with the previously stored alignment value;
wherein during the monitoring if a misaligned special character is detected, then the state machine waits to receive another special character before declaring a loss of synchronization; and
wherein if another special character matching the previously stored alignment value is received, then the state machine moves to a state in which a symbol lock is declared.

3. A host bus adapter (HBA), comprising:
a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value;

wherein the special character is a Comma character;

wherein after a symbol lock is declared, the state machine continues to monitor incoming bit stream data and compares each new special character alignment with the previously stored alignment value;

wherein during the monitoring if a misaligned special character is detected, then the state machine waits to receive another special character before declaring a loss of synchronization; and wherein if a second misaligned special character is received, then the state machine moves to a state in which it has to re-capture synchronization.

4. A method for aligning bit stream data, comprising:

monitoring an incoming bit stream for detecting a first special character symbol;

storing an alignment value of a detected special character;

detecting at least a second special character symbol;

comparing alignment of the second special character symbol with a stored alignment value; and declaring a symbol lock if alignment of the second special character symbol matches with alignment of the first special character symbol.

5. The method of claim 4, wherein the first and second special character is a Comma character.

6. The method of claim 4, wherein at least three special character alignments are compared and all compared alignments match before a symbol lock is declared.

7. The method of claim 4, wherein the bit stream is monitored for a special character after a symbol lock is declared.

8. The method of claim 7, wherein if more than one misaligned special character is received without an intervening correctly aligned special character during the monitoring, then a loss of synchronization is declared.

9. The method of claim 4, wherein if only one misaligned special character is received during the monitoring, followed by a correctly aligned special character, then a loss of synchronization is not declared.

10. A system for transferring data between a host and a storage device, comprising:

a host bus adapter having a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value;

wherein the special character is a Comma character;

wherein after a symbol lock is declared, the state machine continues to monitor incoming bit stream data and compares each new special character alignment with the previously stored alignment value; and wherein during the monitoring if a misaligned special character is detected, then the state machine waits to receive another special character before declaring a loss of synchronization.

11. The system of claim 10, wherein if another special character matching the previously stored alignment is received, then the state machine moves to a state in which a symbol lock is declared.

12. The system of claim 10, wherein if a second misaligned special character is received, then the state machine moves to a state in which it has to re-capture synchronization.

13. A PCI Express device, comprising:

a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value;

wherein the special character is a Comma character;

wherein after a symbol lock is declared, the state machine continues to monitor incoming bit stream data and compares each new special character alignment with the previously stored alignment value; and wherein during the monitoring if a misaligned special character is detected, then the state machine waits to receive another special character before declaring a loss of synchronization.

14. The PCI Express device of claim 13, wherein if another special character matching the previously stored alignment is received, then the state machine moves to a state in which a symbol lock is declared.

15. The PCI Express device of claim 13, wherein if a second misaligned special character is received, then the state machine moves to a state in which it has to re-capture synchronization.

16. A system, comprising:

a PCI Express device having a symbol lock module that includes a state machine for detecting a special character in a serial bit stream received from a serial/de-serializer, wherein the state machine receives a first special character and verifies alignment of the special character by comparing with a previously stored alignment value and the state machine declares a symbol lock if at least more than one special character alignment matches with a same stored alignment value;

wherein the special character is a Comma character;

wherein after a symbol lock is declared, the state machine continues to monitor incoming bit stream data and compares each new special character alignment with the previously stored alignment value; and wherein during the monitoring if a misaligned special character is detected, then the state machine waits to receive another special character before declaring a loss of synchronization.

17. The system of claim 16, wherein if another special character matching the previously stored alignment is received, then the state machine moves to a state in which a symbol lock is declared.

18. The system of claim 16, wherein if a second misaligned special character is received, then the state machine moves to a state in which it has to re-capture synchronization.

* * * * *

UNITED STATES PATENT AND TRADEMARK OFFICE
CERTIFICATE OF CORRECTION

| | | |
|---|---|---|
| PATENT NO. | : 7,230,549 B1 | Page 1 of 1 |
| APPLICATION NO. | : 11/222592 | |
| DATED | : June 12, 2007 | |
| INVENTOR(S) | : David E. Woodral et al. | |

It is certified that error appears in the above-identified patent and that said Letters Patent is hereby corrected as shown below:

In column 10, line 49, in claim 2, after "declared" insert -- , --.

Signed and Sealed this

Ninth Day of November, 2010

David J. Kappos
*Director of the United States Patent and Trademark Office*